United States Patent [19]

Alger et al.

[11] Patent Number: 5,191,713

[45] Date of Patent: Mar. 9, 1993

[54] ELECTRONIC TILT MEASURING SYSTEM

[75] Inventors: Robert M. Alger, Hampshire; Joseph S. Falzon, deceased, late of Hampshire, England, by Leonora Falzon, administratrix

[73] Assignee: The Secretary of State for Defence in Her Britannic Majesty's Government of the United Kingdom of Great Britain and Northern Ireland, London, England

[21] Appl. No.: 555,422

[22] PCT Filed: Dec. 2, 1988

[86] PCT No.: PCT/GB88/01064

§ 371 Date: Jul. 12, 1991

§ 102(e) Date: Jul. 12, 1991

[87] PCT Pub. No.: WO89/05961

PCT Pub. Date: Jun. 29, 1989

[30] Foreign Application Priority Data

Dec. 16, 1987 [GB] United Kingdom ............... 8729382

[51] Int. Cl.$^5$ .............................................. G01C 9/06
[52] U.S. Cl. ........................................ 33/366; 33/228; 33/301

[58] Field of Search ............... 33/366, 321, 239, 228, 33/301, 333

[56] References Cited

U.S. PATENT DOCUMENTS

| | | | |
|---|---|---|---|
| 3,851,399 | 12/1974 | Edwards | 33/228 |
| 4,277,895 | 7/1981 | Wiklund | 33/366 |
| 4,486,844 | 12/1984 | Brunson et al. | 33/366 X |
| 4,531,299 | 7/1985 | Wolfe et al. | 33/366 |

Primary Examiner—Harry N. Haroian
Attorney, Agent, or Firm—Nixon & Vanderhye

[57] ABSTRACT

The invention provides an electronic tilt measuring system for measuring the relative tilts of various platforms such as weapons on a ship. The basic system comprises an inclinometer (1) at each platform, a central control and display unit (2) and a computer (4). The output signals from the inclinometers (1) are passed to the central unit (2) and averaged over a synchronized time period to give an average inclination measurement with respect to the gravity vector over the measurement period. The data is then passed to the computer (4) where it is analysed. The computer (4) is programmed to calculate measured tilts and relative tilts and to produce graphical representations of the data.

21 Claims, 3 Drawing Sheets

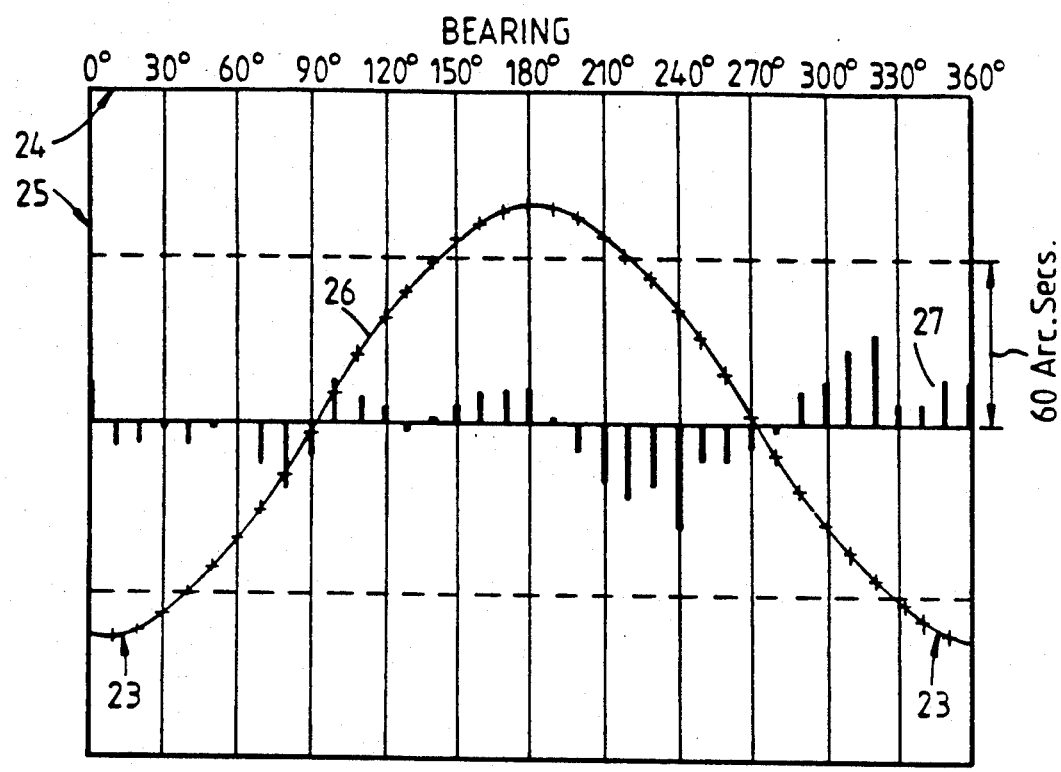
Fig.4.   FULL SCALE = + or − 2 mins. of Arc
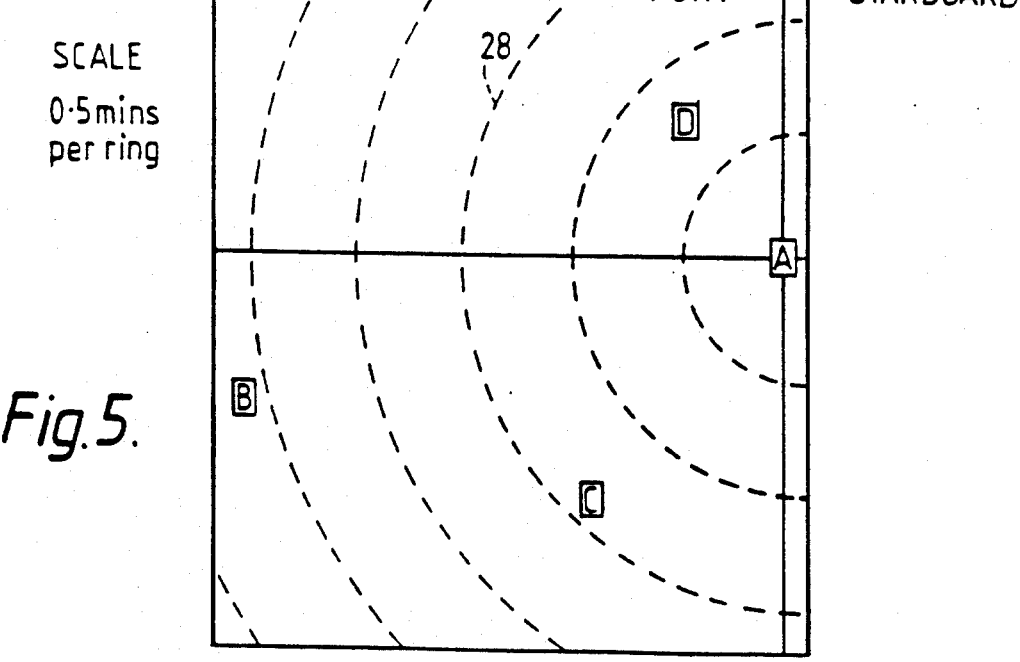
Fig.5.

ELECTRONIC TILT MEASURING SYSTEM

The invention relates to means for measuring the relative tilt of a number of platforms to a nominated datum plane, for example for weapon platforms on board a floating ship.

For a ship weapon system to detect, locate, identify, engage and destroy a target successfully, it is fundamental that the initial alignment of all the weapon and sensor platforms is correct. Thus, a system is required that is capable of accurately measuring the relative tilts between equipment platforms on a floating ship. Furthermore, since work is carried out through all the stages of a warship's life, by shipbuilders and dockyards, it is necessary to be able frequently to measure and correct relative tilts between equipment platforms with respect to the ship's Master Level Datum. If a relative tilt exists between equipments, errors in elevation and training of the weapons result.

The tilt of weapon equipments is defined as the angle by which their planes of rotations are tilted relative to each other, or to the ship's Master Level Datum. This datum platform is usually sited near the neutral pitch and roll axes of the ship and parallel to the calculated water line. The magnitude of the tilt is defined as the maximum inclination of the equipment seating relative to the plane of the datum platform and the direction in which this occurs with respect to the ship's fore and aft line (e.g. 1.5 minutes of arc at a bearing of 45° to Port).

If a relative tilt exists between equipments, the errors resulting in the weapon alignments vary depending on the elevation and bearing of the equipments. When the equipment is trained to the tilt relative bearing, the elevation error is a maximum and equal to the tilt angle whilst the training error is zero and, when the equipment is trained at right angles to the tilt relative bearing, the elevation error is zero whilst the training error is proportional to the tangent of the elevation angle of the equipment. As the equipment elevates this training error increases, equalling the tilt angle at an elevation of 45° and becoming more pronounced at higher elevations. For bearings other than those along or normal to the tilt relative bearing, errors exist in both elevation and training.

To achieve desirable system accuracies it is necessary to reduce the relative tilt angles between equipments to within prescribed limits, either by mechanical or computer software corrections. This particularly applies to equipments capable of high angles of elevation.

The conventional technique for measuring weapon platform tilts used by dockyards and shipbuilders requires the ship to be positioned in dock, breast-shored in a stable position, but still just waterborne, before commencing a tilt test. This is necessary to restrict the motion of the ship to enable measurements to be taken using bubble type clinometers. The loading of the ship must be as near as possible to sea-going conditions and any movement on board must be kept to a minimum. Tilt rings, (for platform adjustments) are set to zero if they are fitted.

A 6° bubble type clinometer is set initially parallel to the fore and aft line of the ship on a convenient rigid position on each equipment under test. Each clino is placed on a special 3° wedge to ensure that all readings throughout the test are positive.

A master clino is set up on a portable turntable, which is sited in a suitable ship position where communications are available to all weapon platform stations under test and which is levelled to the horizontal plane.

The portable turntable is trained from 0° to 360° in 10° steps, at the same time as the equipment under test. For each 10° step the operator at the master position first adjusts his clino until the bubble is central. He then presses a bell push which rings a bell at all remote stations, to enable the clino readers at the platform stations to adjust their clinos until all bubbles are synchronised with the master. Any movement in the ship during this period necessitates a repeat of the exercise on that bearing. When all positions report that their clinos are lined up to the master, readings are taken and recorded and the equipment trained to a new bearing.

Throughout the test the master clino reading is subtracted from the equipment clino readings on identical bearings and a sine curve for each equipment is produced, to indicate errors in individual readings or serious non-flatness in the roller path.

On completion of the trial the differences between the clino readings for each pair of supplementary bearings are plotted on a radial plot in the direction in which the highest reading occurs. A best fit circle is then drawn through these points, from which the magnitude and direction of the tilt can be measured. These measured tilts are then replotted on a further tilt diagram, to enable the relative tilts between equipments to be determined. Corrections are then made by adjustment of the equipment tilt rings, where fitted, and a further cardinal points tilt test is then carried out to determine the residual tilt, which is then fed into the weapon system computer software.

This tilt test technique, whilst effective in achieving the end result, is both inefficient and expensive in the use of manpower and resources. It imposes a severe burden on the limited docking facilities available due to the requirement to position a ship in dock, waterborne in a breast shored condition, for a period of up to 5 days. These difficulties highlight the need for a system capable of permitting weapon alignment procedures to be carried out on a ship floating in harbour. Such a system would enable tilt tests to be carried out as and when required, at a fraction of the cost of the conventional technique.

An alternative system used an electrolevel in place of the traditional bubble level. An electrolevel was sited on each equipment and the outputs of each electrolevel were differenced to provide measurements of the tilt of each equipment. However, the electrolevel system involved bulky, heavy equipment, was difficult to use and tended to be inaccurate and unreliable.

The object of the invention is to provide a system for measuring relative tilts between various platforms with respect to a nominated datum when the platforms may be subjected to motion.

It is a particular object of the invention to provide a tilt measuring system capable of being used on a floating ship to measure and correct for relative tilts of ship's weapon and sensor equipment on different equipment platforms.

The invention provides a means for measuring relative tilt of one or more platforms to a nominated datum platform, comprising at least one inclinometer per platform and characterised in that it further comprises:

means to average each inclinometer output over a synchronised time period; and a computer programmed to analyse measured data, calculate tilt angles and relative tilts and display the results.

Advantageously a central control position is provided, and means to display the averaged inclinometer outputs over synchronised time periods as readings are preferably included at the central control position.

An inclinometer is a transducer used by the system to determine the tilt of platforms. "Inclinometer" is the name ascribed to a low range linear accelerometer which can be used as a slope detector because it is very responsive to changes in gravitational acceleration. The preferred type for use in the invention is a solid state, dc, closed loop, force balance tilt sensor. This type of sensor is suitable for the invention since it includes a flexure supported torque balance system, rugged enough to withstand severe shock and vibration and still maintain excellent accuracy. Preferably each incinometer and its associated electronics are enclosed within a sealed housing, permitting operation in high moisture and salt laden atmospheres without deterioration in performance.

Advantageously each inclinometer has built-in temperature compensation, thus permitting its operation over a wide range of temperatures without a significant effect on the accuracy.

Preferably there is only one inclinometer at each platform.

Preferably there is also an inclinometer included at the nominated datum platform.

Inclinometers are primarily devices for the static measurement of tilt. Thus when used in a dynamic situation on a floating ship the output of each device is affected by all linear accelerations experienced along its sensitive axis. The output at any instant in time is therefore the algebraic sum of any static tilt with respect to gravity, plus the acceleration component due to ship's motion.

When two inclinometers are used differentially to determine the relative tilt between equipment platforms, as in a tilt test, measurement errors will result because the linear accelerations caused by ship's motions are not equal at all positions. Significant variations are seen when the recorded outputs from inclinometers mounted in different positions are compared. The mechanical stiffness of the various parts of the ship affects the frequency content of the responses. Thus the relative magnitudes of the accelerations at the two positions are dependent on their frequency content as well as their respective heights above the roll centre of the ship.

The measurements are derived by averaging each inclinometer output over a synchronised time period. Preferably this is done electronically. The preferred means is a dual slope integrating analogue to digital converter. Conveniently an averaging period of between 10 and 20 seconds is used as this will produce repeatable display readings to a few seconds of arc. The resultant display reading represents the average inclination with respect to the gravity vector over the measurement period and the algebraic summation of any two positions represents the relative tilt measurement on a given bearing. The display reading is preferably given as an angle.

The averaging of the outputs is applicable because the difference in acceleration effects between any two positions approximates to zero when averaged over a time period that is significantly greater than the period of ship's motion, due to a basic similarity of the inclinometer outputs and their sinusoidal nature.

Preferably the means to display the readings at the central control position is a display unit, which can be termed the master display unit or MDU. The MDU houses a display, conveniently an L.E.D. or liquid crystal display, for each inclinometer on which the averaged output reading of each inclinometer is shown for a particular measurement position. The displays are conveniently calibrated to display minutes of arc to one decimal place (i.e. resolution to 6 seconds of arc). The displays are conveniently seven segment displays. Preferably the MDU houses electronic circuits to process the signals to provide an averaged signal over a set time period, the time period being synchronised for all the inclinometers.

Preferably the system includes means to calibrate the displays to compensate for temperature variations. The calibration means advantageously include one or more temperature-stable voltage sources.

The computer is programmed to calculate the tilt angle, relative to the datum platform, of each platform. The program advantageously uses an iterative method to produce a "best fit" sine curve for the recorded data on all bearings at which readings are taken for each equipment. Preferably the computer is also programmed to calculate the relative tilt of each platform with respect to any selected datum platform.

The nominated datum platform may be a special purpose ship's Master Level Datum or a selected one of the ship's equipment platforms or any other specified datum.

A means of communication is preferably provided between the platforms and the central control unit. A built-in communications system with a wire link running through the cables used to interconnect the MDU and the remote inclinometers is preferably used. Alternatively a battery powered intercom system may be used. In some cases, for example on board a ship, it is possible to use already existing communications and in these cases a communications system would not need to be included in the tilt test equipment.

Optionally the inclinometer at each platform can be connected to a local display unit to display the reading of that inclinometer.

The invention will be referred to as an Electronic Tilt Measuring System (ETMS).

The invention further provides a method of measuring relative tilt of one or more platforms to a nominated datum platform comprising the steps of:

1) positioning at least one inclinometer on the or each platform and at the nominated datum platform;
2) connecting each inclinometer to a central control unit;
3) training all the platforms to a common bearing;
4) reading the measured values from each inclinometer at the central control unit and averaging each of the measured values over a synchronised time period;
5) entering the reading into a computer;
6) training the platforms to another common bearing;
7) repeating steps 4) to 6) as many times as required;
8) analysing the readings by means of a computer program; and
9) displaying or reading the results.

The platforms may be trained to any convenient number of bearings. Conveniently this may be 36 with each platform moved in 10° steps. A smaller number of bearings such as 12 may be sufficient to achieve acceptable results, though, as the time saving is minimal in taking fewer results, it is preferable to take more results as a greater number of readings provides a more accurate picture of the tilt of the platform.

The readings of the measured values of the inclinometers may be fed directly to the computer via a databus. In this case it is not necessary to have displays of the readings at the MDU though it may be advantageous to include such displays to increase user confidence of the system and allow progress of the test to be monitored. Alternatively the results may be displayed, read by an operator and keyed into the computer manually.

When the test is completed on all bearings the data is analysed by the computer. Preferably a "best fit" sine curve is displayed for each platform on a visual display unit controlled by the computer.

Preferably the computer then determines and displays the relative tilt of all the platforms relative to any one of the other platforms or the nominated datum platform.

Adjustments can be made to the separate platforms to reduce the relative tilts. Additionally or alternatively for a ship's weapon system the resulting tilts may be fed into the ship's weapon system computer software to enable corrections to be made in the operation of the system to allow for relative tilts.

The invention will now be described by way of example with reference to the drawings, of which:

Figure 3A:
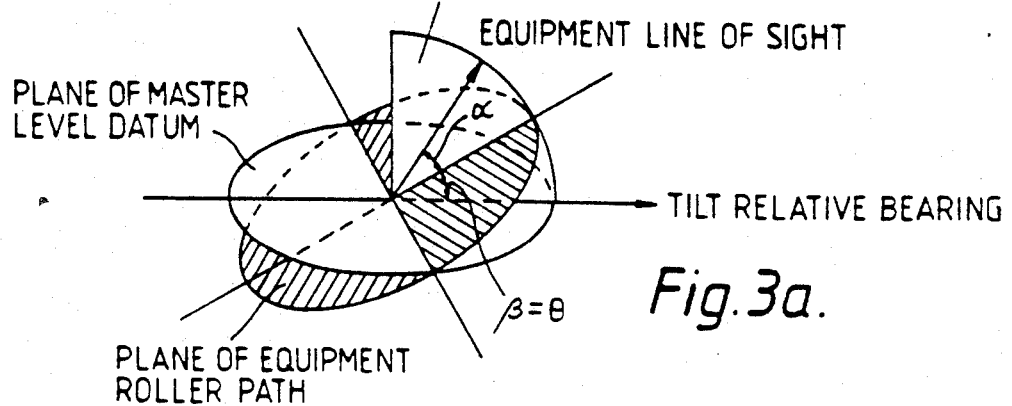

FIGS. 3a and b show how tilt errors occur when the equipment is trained on the tilt relative bearing and at right angles to the tilt relative bearing respectively;

FIG. 4 shows a typical sine plot of measurements of a weapon platform; and

FIG. 5 shows a typical relative plot of the relative tilts of three weapon platorms to a datum platform.

Figure 1:
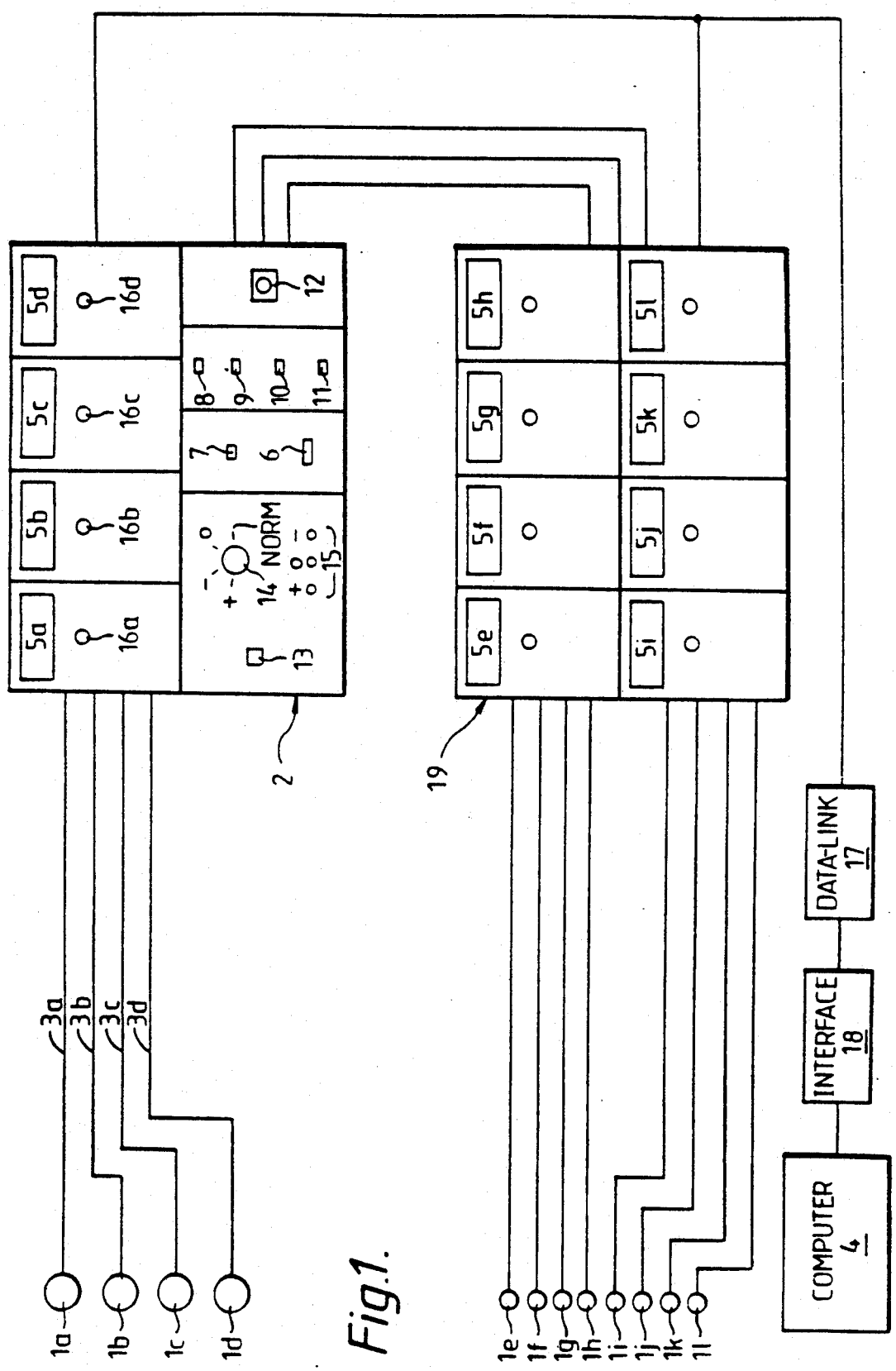
FIG. 1 shows a block diagram of an Electronic Tilt Measuring System (ETMS)

FIG. 1 shows a schematic block diagram of an Electronic Tilt Measuring System. The basic system comprises inclinometers 1a,b,c and d, a Master Display Unit 2, interconnection cables 3a,b,c and d, and a computer 4.

A typical commercially available inclinometer 1 is an extremely accurate device which is capable of responding to changes in angle as small as 0.1 second of arc and with a quoted linearity of 0.05% of full scale. The inclinometer 1 is a closed loop servo accelerometer which works on the principle of a pendulous mass with a single degree of freedom, which reacts to an input along its sensitive axis causing the mass to move. A position sensor detects this minute motion and develops an output signal, which is demodulated, amplified and applied as negative feedback to an electrical torque generator (torquer) coupled to the mass. The torquer develops a torque proportional to the current applied to it, which just balances the torque attempting to move the pendulous mass as a result of the acceleration input, preventing further movement of the mass. This current which produces the equal and opposite torque is therefore proportional to the product of moment of inertia (a constant) and acceleration. If this current is passed through a stable resistor the voltage developed across the resistor is proportional to the applied acceleration.

The inclinometer output is thus an analogue dc signal directly proportional to the angle of tilt. The range of the device chosen is quoted as ±1°, for which the dc output approximates as ±5 volts, though it has a usable range of up to ±3°. Trials so far carried out however have indicated that the range of ±1° is more than adequate for conducting a tilt test on a floating ship, as normal ship's verticality is within ±30 minutes.

The normal operating mode of the inclinometers is for the static measurement of tilt of a surface. When used on board a ship which is subjected to a continuous oscillatory motion due to sea action, the output is an angle which varies with time. Under these circumstances, the accuracy of the inclinometer output is dependent upon its dynamic characteristics. A typical frequency response of a device such as this, which behaves like a damped simple pendulum with a characteristic natural frequency, is for both the magnitude and phase of the measured output to vary as the frequency increases with respect to the base input.

The relative dynamic characteristics between all of the inclinometers is a potential source of inaccuracy but a spectral analysis of the inclinometer output in response to a sinusoidal and a step input confirmed the bandwidth of the inclinometers to be above 3 Hz, which was considered to be well outside the maximum frequency of ship's motion of 0.5 Hz to which the inclinometers are required to respond in the present invention. The sinusoidal and step base inputs were first applied in a static position in the laboratory. When used on board ship, there is the further complication of the motion which will produce an acceleration component in the inclinometer output. The relative responses of the inclinometers to this effect were studied by comparison of the analogue recordings obtained from two inclinometers mounted adjacent to each other on board a floating ship when the conditions were severe. Recordings were taken for comparison at a number of positions around the ship and at various heights above the roll centre of the ship. The recordings were virtually identical and hence it was confirmed that the inclinometer responses were similar.

The individual inclinometer frequency responses showed that up to 0.5 Hz, the frequency of interest, the magnitude of their outputs is constant, with a small phase lag difference between extremes. This phase lag would produce an error in differential display readings proportional to the magnitude of ship's motion if instantaneous measurements were taken at two or more positions but because an averaging technique is used any resulting errors are insignificant.

The Master Display Unit (MDU) 2 is the master control position from which the tilt test is coordinated. The MDU 2 houses four liquid crystal displays 5a,b,c,d, one for each remote position inclinometer 1a,b,c,d, with an appropriate display drive circuit (not shown) for each display. The displays 5 are calibrated to show minutes of arc to one decimal place (i.e. resolution to 6 seconds of arc).

FIG. 1 indicates a number of other features included at the MDU:

a) A Display Freeze switch 6—this allows simultaneous freezing of all the displays in the system, with a separate lamp 7 to indicate the current state;

b) An Integration lamp 8—this gives a visual display of when an integration phase is taking place;

c) A Display Read lamp 9—this gives an indication of when the Display reading can be taken on a given bearing;

d) A Reset switch 10—this resets the Display Read lamp 9 to Off;

e) A Display Test switch 11—this sets all the displays readings to −188.8, to check their correct functioning;

f) Communications input 12—this is the input socket for a communications system (not shown) to all remote stations;

g) DC Supply switch 13—to switch on the power supplies (not shown).

h) A Calibration switch 14—this enables all the displays to be calibrated simultaneously. During calibration (switch positions +, −, 0) a fast update mode (over a period of 0.3 seconds) is used. A slow update mode (over a period of 64 seconds) is used during a tilt test. During this 64 second period there is a synchronised integration phase for all displays of 1000 samples, equal to 16 seconds, during which the average dc level of the inclinometer output for each position is determined and displayed;

i) Test Power inputs 15—allow the calibration to be checked externally; and j) Adjustment controls 16a,b,c,d—these enable the displays to be tuned to give the correct readings when they are calibrated.

Details of the foregoing are not given as these will be readily apparent.

The output signals from the inclinometers 1a,b,c,d are passed from the MDU 2 to the microcomputer 4 via a datalink 17 and an interface 18. The microcomputer 4 is programmed to analyse the measured data. A complete set of data can be analysed by this means in a few minutes, immediately on completion of a tilt test, as opposed to a delay of several hours using conventional techniques.

The computer first calculates the measured tilt of each weapon platform by producing a "best fit" sine curve to the recorded data on all bearings using an iterative method. It produces an amplified graphical representation of the difference in amplitude between the recorded value and the sine curve value for each bearing. It also produces the more traditionally accepted radial diagrams.

Subsequently the computer calculates the relative tilt of each weapon platform with respect to either the Master Level Datum platform or any selected master platform.

It is desirable for the ETMS to be as autonomous as possible so as to reduce reliance on ship's equipment and staff. Thus a communications link to all positions is included in the system (but not shown here).

The accuracy of the system is dependent on the magnitude of the measurement errors. These are dependent on the accuracy of the devices being used, their temperature stability, calibration and the design of the circuits.

Temperature effects are potentially the greates source of error in electronic circuits but careful design can eliminate most of the problems. The inclinometers 1 have two potential temperature effects, i.e. Scale Temperature Coefficient at 0.02% per °C. and Null Temperature Coefficient at 0.05% Full Scale per °C., but these should not be significant in normal usage.

The MDU 2 can be extended for further inclinometer readings by a "plug in" extension unit 19, here shown with eight further channels. This unit includes eight further displays 5e to 5l, similar to displays 5a to 5d, which display readings corresponding to inclinometers 1e to 1l.

Figure 2:
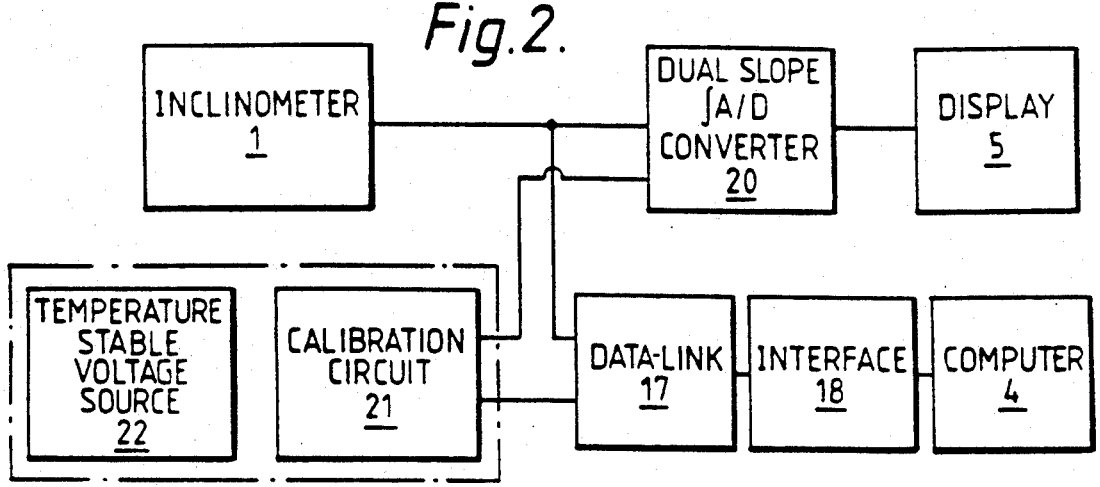
FIG. 2 shows a block diagram of a single channel of the ETMS of FIG. 1 in more detail.

In FIG. 2, a block diagram of a single channel of the ETMS of FIG. 1 is shown in more detail. The arrangement allows two different methods of measurement. In the first, the inclinometer outputs are averaged by a dual slope integral analogue to digital converter 20 and displayed on the displays 5. The displayed readings can then be entered by hand into the computer 4. In the second method, the outputs from the inclinometer 1, on each bearing, are passed to the computer 4 via a datalink 17 and an interface 18 and are averaged using a computer sampling technique. The averaged results are then stored by the computer 4 ready for calculation of the tilts.

Before commencing a tilt test the displays 5 are calibrated by means of a calibration circuit 21, at their temperature of operation, to read ±60.0 minutes of arc using a temperature stable voltage source 22. This is a very simple and yet accurate method of calibrating the system and has the added advantage of checking the electronic circuits. The net result is that the display temperature errors are effectively eliminated.

The output voltage from the temperature-stable source 22 is used to calibrate the displays 5. It is derived from the inclinometer output for ±1 degree angle at 22° C. If the inclinometer were then used at zero °C., its output would be in error by 16 seconds of arc (Full Scale×0.02%× degree C. change), due to the Scale Factor Temperature Coefficient. The magnitude of this error is within the specified accuracy required from the system but could be corrected via the computer software if necessary.

The Null Temperature Coefficient (Full Scale×0.05%×degree C. change) is a measure of the shift in the dc output from the inclinometer at zero tilt due to temperature. Because of the measurement technique used during a tilt test, any dc offset such as this does not affect the accuracy of the measurement, providing the temperature remains reasonably constant throughout the test. Experience has shown that temperature variations are small but even if this were not so any resulting errors would be insignificant.

As shown, the magnitude of the temperature errors when based on the full scale output of the inclinometers of ±1 degree angle, are small. These errors, however, become insignificant when the tilt test technique is considered. Reciprocal bearings are taken and added algebraically to produce a radial plot. Therefore, because both readings are in error due to temperature, the errors effectively cancel each other out with only the resultant difference reading between them being in error and as this is rarely greater than a few minutes of arc, the magnitude of any temperature errors will be a few seconds of arc at the worst.

The accuracy of the component parts has been examined in laboratory experiments. These have demonstrated that the measurement accuracy of a static single reading to be of the order of ±6 seconds of arc. The inaccuracies due to most of the component parts of the system are too small for consideration.

The greatest sources of measurement errors are the inclinometers which have a quoted linearity of ±0.05%, which is approximately ±2 seconds of arc for their full range output of ±1 degree and the LED displays which have a resolution of 1 digit or 6 seconds of arc.

For accurate measurement, the calibration of the instrument must be accurate to start with. The static calibration of the four inclinometers of FIG. 1 was checked periodically between tilt tests. This checking is carried out by a very simple yet accurate technique using a calibrated sine bar and wedges on a surface plate to tilt the inclinometer by an extremely accurate angle. Measurements have confirmed the repeatability of the inclinometer outputs and the reliability of the devices.

Figure 3B:
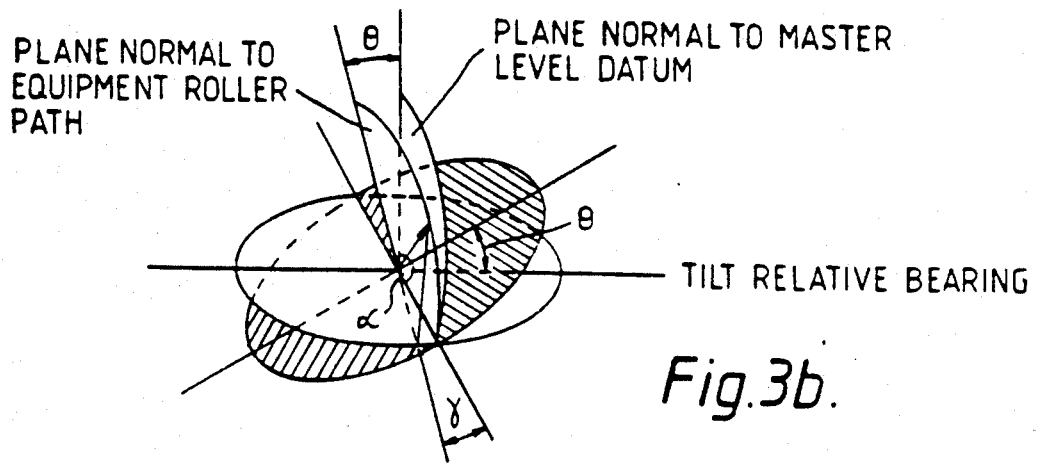

FIGS. 3a and b illustrate the principles involved in elevation and training tilt errors where the plane of an equipment roller path is related to the plane of the master level datum. FIG. 3a shows how, when the equipment is trained to the tilt relative bearing, the elevation error $\beta$ is a maximum and equal to the tilt angle $\theta$ whilst the training error $\gamma$ is zero. FIG. 3b shows how, when the equipment is trained at right angles to the tilt relative bearing, the elevation error $\beta$ is zero whilst the training error $\gamma$ is proportional to the tangent of the elevation angle $\alpha$ of the equipment. As the equipment elevates this training error $\gamma$ increases, equalling the tilt angle $\theta$ at an elevation of 45° and becoming more pronounced at higher elevations. For bearings other than those along or normal to the tilt relative bearing, errors exist in both elevation and training.

To achieve system accuracy, the relative tilt angles between equipments must be reduced to within prescribed limits. This is particularly applicable to equipments capable of high angles of elevation because of the increase in the training error $\gamma$ at high angles of elevation as shown in FIG. 3b. The corrections are achieved by mechanical or computer software controls.

The tilt test is carried out with the ship tied up alongside in harbour. There are no restrictions on weather conditions or general movement on board ship.

The Master Display Unit 2, from which the test is controlled, is positioned in any convenient office on board ship and the cables 3 are run out to the remotely positioned inclinometers. Before commencing a test the equipment is switched on and the electronic circuits allowed to warm up for a short time as the equipment stabilises to the surrounding air temperature. The displays 5 and/or the computer 4 are then calibrated to the reference source 21.

The tilt test commences when the Master position instructs all equipments to be moved to a common bearing. After all equipments have confirmed the bearing the inclinometer outputs are fed to the computer. When the computer has taken the readings the program indicates that the next bearing can be set and the Master position instructs all equipments to train to the next bearing. The readings are then taken and the process is repeated for 36 bearings.

On completion of the trial, the data is analysed by the computer and a best fit sine curve for each equipment displayed. The relative tilt between all equipments is then determined with reference to a selected Master platform.

FIG. 4 shows a typical sine plot of the measured tilt calculated by the computer for a weapon equipment platform on board a ship. Each reading 23 was plotted on a graph showing 0° to 360° along the x-axis 24. The scale on the y-axis 25 depends on the maximum values measured. A "best fit" sine curve 26 is produced by an iterative method and displayed on the graph. The computer further produces an amplified graphical representation 27 (scale ±120 seconds of arc) of the difference in amplitude between the recorded value and the sine curve value for each bearing. These give a graphical representation of the equipment tilts. The computer further processes this information to produce values of the tilt of each platform relative to a selected Master datum. Correction can then be applied mechanically or the information can be fed into the weapons system software so that corrections can be made within the software control to allow for the relative tilts between all the equipments.

FIG. 5 shows a typical relative plot calculated by the computer from the information used to produce FIG. 4. Point A is the reference datum to which the tilts of the weapon platforms are calculated. Each dashed ring 28 represents 0.5 mins of tilt from the datum. Each point B, C and D mark the maximum tilt of the respective weapon platforms. Thus B has a maximum tilt of 2.6 mins at a bearing of 103° to port, relative to the datum platform A, C has a maximum tilt of 1.4 mins at 138° to port and D has a maximum tilt of 0.7 mins at 039° to port.

The overall saving in time and manpower with ETMS is considerable. The measurement and correction of weapon platform tilts can be completed in a day by a small team of people, whereas the current technique employs a large workforce and takes 3 to 5 days, including docking, breast-shoring and undocking.

Because the technique of the invention averages motion effects during the integration period there are no limitations and restrictions on when and where the system can be used, providing measurements are confined to the linear range of the inclinometers. The repeatability of the readings also makes the system suitable for other possible applications on floating ships where accurate alignment between remote positions is required e.g. to assist in aligning the horizontal axis of a theodolite to the ship's master level datum before use on weapon alignment.

The current methods of conducting tilt tests are inefficient in the use of both manpower and resources. The ETMS offers an alternative which is quicker, simple to use, at least as accurate and represents a considerable saving in both dockyard and operational costs, at what is a relatively small initial cost per system.

Although the device has been described in relation to a four channel unit with an eight channel extension, it will be clear that any suitable number and arrangement of channels in a unit can be used.

It will be obvious that any required number of inclinometers can be included in the system.

The invention is not limited to the measuring of tilts of ship weapons platforms. It can also be used when setting up fixed weapon positions, for example on fighter aircraft, and for checking the positions of other equipments. It can also be adapted for checking the alignment of remote axes, for example on long shafts, or for checking the axes of equipments such as gyroscopes.

It is claimed:

1. A means for measuring relative tilt of one or more platforms to a nominated datum platform, comprising at least one inclinometer per platform and characterised in that it further comprises:
    a) means to average each inclinometer output over a synchronised time period; and
    b) a computer programmed to analyse measured data, calculate tilt angles and relative tilts and display the results.

2. A means for measuring relative tilts according to claim 1 characterised in that a central control position is provided to average each inclinometer output over the synchronised time period.

3. A means for measuring relative tilts according to claim 2 characterised in that means to display the averaged inclinometer outputs as readings are included at the central control position.

4. A means for measuring relative tilts according to claim 4 characterised in that the means to display the readings at the central control position is a master display unit (MDU) which houses electronic circuits to process each signal and to provide an averaged signal over a set time period, the time period being synchronised for all the inclinometers.

5. A means for measuring relative tilts according to claim 4 characterised in that the system includes means to calibrate the displays to compensate for temperature variations.

6. A means for measuring relative tilts according to claim 1 characterised in that the inclinometers are solid state, dc, closed loop, force balance tilt sensors.

7. A means for measuring relative tilts according to claim 1 characterised in that each inclinometer has built-in temperature compensation.

8. A means for measuring relative tilts according to claim 1 characterised in that there is an inclinometer included at the nominated datum platform.

9. A means for measuring relative tilts according to claim 1 characterised in that the averaging of the inclinometer outputs is done by electronic means.

10. A means for measuring relative tilts according to claim 9 characterised in that the averaging means is a dual slope integrating analogue to digital converter.

11. A means for measuring relative tilts according to claim 10 characterised in that an averaging period of between 10 and 20 seconds is used.

12. A means for measuring relative tilts according to claim 1 characterised in that the computer is programmed with an iterative method to produce a "best fit" sine curve for the recorded data on all bearings at which readings are taken for each equipment.

13. A means for measuring relative tilts according to claim 12 characterised in that the computer is also programmed to calculate the relative tilt of each platform with respect to any selected datum platform.

14. A means for measuring relative tilts according to claim 2 characterised in that a means of communication is provided between the platforms and the central control position.

15. A means for measuring relative tilts according to claim 1 characterised in that the inclinometer at each platform is connected to a local display unit to display the reading of that inclinometer.

16. A means for measuring relative tilts according to claim 1 characterised in that each inclinometer and its associated electronics are enclosed within a sealed housing.

17. A method of measuring relative tilt of one or more platforms to a nominated datum platform comprising the steps of:
1) positioning at least one inclinometer on said one or more platforms and at the nominated datum platform;
2) connecting each inclinometer to a central control position;
3) training all the platforms to a common bearing;
4) reading the measured values from each inclinometer at the central control position and averaging each of the measured values over a synchronised time period;
5) entering the readings into a computer;
6) training the platforms to another common bearing;
7) repeating steps 4) to 6) as many times as required;
8) analysing the readings by means of a computer program; and
9) displaying or reading the results.

18. A method of measuring relative tilts according to claim 17 characterised in that the platforms are trained to 36 bearings with each platform moved in 10° steps.

19. A method of measuring relative tilts according to claim 17 characterised in that a "best fit" sine curve is displayed for each platform on a visual display unit controlled by the computer.

20. A method of measuring relative tilts according to claim 19 characterised in that the computer then determines and displays the relative tilt of all the platforms relative to any one of the other platforms or the nominated datum platform.

21. A method of measuring relative tilts according to claim 20 characterised in that the relative tilt results are used to determine the adjustments to be made to the separate platforms to reduce the relative tilts.

* * * * *